(12) United States Patent
Nam et al.

(10) Patent No.: US 7,466,072 B2
(45) Date of Patent: Dec. 16, 2008

(54) CARBON NANOTUBE AND ELECTRON EMISSION DEVICE INCLUDING THE CARBON NANOTUBE

(75) Inventors: Joong-Woo Nam, Suwon-si (KR); Mee-Ae Ryu, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 499 days.

(21) Appl. No.: 11/272,089

(22) Filed: Nov. 14, 2005

(65) Prior Publication Data
US 2006/0238094 A1    Oct. 26, 2006

(30) Foreign Application Priority Data
Nov. 15, 2004    (KR) .................... 10-2004-0092993

(51) Int. Cl.
*H01J 1/62*    (2006.01)

(52) U.S. Cl. ................ 313/495; 313/309; 313/336; 313/351

(58) Field of Classification Search ........... 313/495, 313/309, 310, 336, 351
See application file for complete search history.

(56) References Cited

U.S. PATENT DOCUMENTS
6,335,330 B1 *   1/2002   Ross ......................... 514/221

FOREIGN PATENT DOCUMENTS
JP    2003-288833    10/2003
KR    1020010056153 A    7/2001

\* cited by examiner

*Primary Examiner*—Vip Patel
(74) *Attorney, Agent, or Firm*—H.C. Park & Associates, PLC

(57) ABSTRACT

Provided are a carbon nanotube in which a Full-Width at Half-Maximum of X-ray diffraction is 0.6 or less, an electron emission source including the carbon nanotube, and an electron emission device including the electron emission source.

7 Claims, 4 Drawing Sheets

CARBON NANOTUBE AND ELECTRON EMISSION DEVICE INCLUDING THE CARBON NANOTUBE

CROSS-REFERENCE TO RELATED PATENT APPLICATIONS

This application claims priority to and benefit of Korean Patent Application No. 10-2004-0092993, filed on Nov. 15, 2004, in the Korean Intellectual Property Office, which is hereby incorporated by reference for all purposes as if fully set forth herein.

FIELD OF THE INVENTION

The present invention relates to a carbon nanotube, an electron emission source including the carbon nanotube, and an electron emission device including the electron emission source. In particular, the present invention relates to a carbon nanotube in which a Full-Width at Half-Maximum (FWHM) of X-ray diffraction is 0.6 or less, an electron emission source including the carbon nanotube, and an electron emission device including the electron emission source.

DESCRIPTION OF THE RELATED ART

Electron emission devices are displays that create images by emitting light by having phosphors in a phosphor layer of an anode plate collide with electrons emitted from electron emission sources of a cathode under an electric field generated when a voltage is applied to the anode and the cathode.

Carbon-based materials, including Carbon Nano Tubes (CNTs) having good electron conductivity, have properties such as good field enhancement effect, low work function, good field emission property, low driving voltage, and device fabrication over a large area. Therefore, carbon-based materials are good electron emission sources for electron emission devices.

Korean Patent Laid-Open Publication No. 2001-0056153 discloses a field emission display including a carbon nanotube film and a method of manufacturing the same. The field emission display has a cathode array structure, including an electron-emitting cathode made of a metal formed on a substrate of a cathode plate, an insulating layer and a carbon nanotube film used as an emitter electrode which are alternately formed on the cathode, and a gate electrode formed on the insulating layer.

Japanese Patent Laid-Open Publication No. Hei. 15-288833 discloses a catalyst for forming of a carbon fiber and a preparation method thereof, an electron emission device, an electron emission source, and an image forming apparatus. The electron emission device includes a plurality of carbon fiber-containing films. The carbon fiber-containing films exhibit the following Raman scattered light intensity distribution characteristics at a laser wavelength of approximately 514.5 nm: a first peak appears in the Raman shift range of approximately 1355±10 (Kaiser) and a second peak appears in the Raman shift range of approximately 1580±10 (Kaiser), and the FWHM at the first peak (FWH1) and the FWHM at the second peak (FWHM2) have a relationship of approximately FWHM2/FWHM1≦1.2.

However, currently available electron emission devices, including the above-described electron emission devices, do not have sufficient crystalline structures and I-V characteristics (current-voltage characteristics: characteristics of current or current density ($\mu A/cm^2$) measured under an applied voltage or field ($V/\mu m$)) of carbon nanotubes. Therefore, the carbon nanotubes should be developed with high crystallinity and improved I-V characteristics.

SUMMARY OF THE INVENTION

The present invention provides a carbon nanotube which has high crystallinity and good I-V characteristics, an electron emission source including the carbon nanotube, and an electron emission device including the electron emission source. The present invention also provides a method of manufacturing the electron emission device.

Additional features of the invention will be set forth in the description which follows, and in part will be apparent from the description, or may be learned by practice of the invention.

The present invention discloses a carbon nanotube in which a Full-Width at Half-Maximum of X-ray diffraction is 0.6 or less.

The present invention also discloses an electron emission device including a substrate, a cathode formed on the substrate, and an electron emission source electrically connected to the cathode formed on the substrate and comprising a carbon nanotube in which a Full-Width at Half-Maximum of X-ray diffraction is 0.6 or less.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
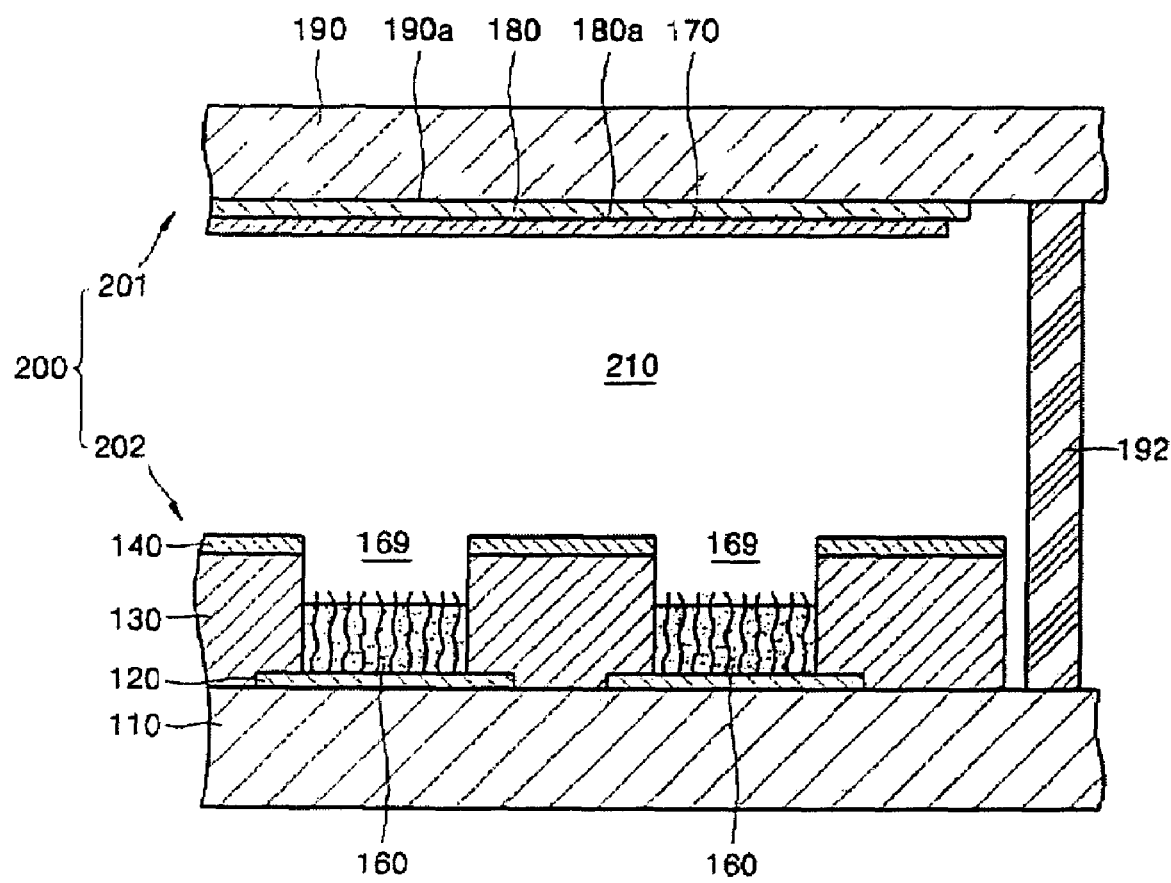
FIG. 1 is a sectional view illustrating an electron emission device according to an embodiment of the invention.

The present invention now will be described more fully hereinafter with reference to the accompanying drawings, in which preferred embodiments of the invention are shown. The present invention may, however, be embodied in many different forms and should not be construed as limited to the embodiments set forth herein The present invention provides a carbon nanotube in which a Full-Width at Half-Maximum (FWHM) of X-ray diffraction is less than or equal to 0.6.

In an X-ray diffraction analysis, the term "Full-Width at Half-Maximum (FWHM)" refers to a peak width at half maximum peak intensity. When the FWHM profile exhibits good crystallinity at a bell shaped peak having a substantially normal distribution, a peak width appears narrow at the same $2\theta$ positions. The FWHM profile is used to determine uniformity of a crystal structure. Thus, FWHM analysis can be used in determining a degree of crystallinity.

Generally, as the crystallinity of a carbon nanotube increases, the carbon nanotube becomes firmer and the lifetime increases, thereby improving the reliability of a display. The I-V characteristics of a carbon nanotube indicate electron emission characteristics. A carbon nanotube with good I-V characteristics exhibits low-voltage driving and high brightness characteristics. When a display is driven at a low voltage, a drive integrated circuit with low driving voltage may be used, which reduces cost and power consumption.

The invention provides a carbon nanotube having a FWHM of X-ray diffraction of less than or equal to 0.6.

According to an embodiment of the invention, the carbon nanotube has a $2\theta$ range from approximately 26.5 to 65 based on an X-ray diffraction analysis. Preferably, a FWHM at each $2\theta$ position is less than or equal to 0.6. When the FWHM is greater than 0.6, crystallinity may be poor and electron emission characteristics may decrease.

The carbon nanotube may be synthesized by various methods, including electric discharge, laser deposition, vaporization, thermal chemical vapor deposition, and plasma enhanced chemical vapor deposition. Preferably, the carbon nanotube is synthesized by an arc discharge using a hydrogen gas. The carbon nanotube of the present invention may be formed by the method described below.

A catalytic metal for growth of a carbon nanotube may be provided. For example, the catalytic metal may be formed of cobalt, nickel, iron, or an alloy thereof. For example, the catalytic metal may be deposited to a thickness of several to hundreds of nanometers on a substrate such as glass, quartz, silicon, or alumina ($Al_2O_3$) by thermal deposition, e-beam deposition, or sputtering. The resultant catalytic metal film may be etched to form nanoscale catalytic metal particles which are separated from each other. An ammonia gas, a hydrogen gas, a hydride gas, etc., may be used as an etch gas The etch gas allows etching of the catalytic metal film along a grain boundary of the substrate to form high-density, uniform nanoscale catalytic metal particles which are separated from each other.

According to another embodiment of the invention, the catalytic metal may be provided using a zeolite support. A catalytic metal may be combined with the zeolite support by a vacuum impregnation method or an ion exchange method. Examples of a catalyst made using a zeolite support include a Co/Y catalyst, a Co/ZSM-5 catalyst, and a Fe/Y catalyst. For example, synthesis of a catalyst using a zeolite support may be performed using a Co or Fe acetate solution, and a final Co or Fe content may be approximately 2.5 wt %.

As described above, for example, after a catalytic metal for growth of a carbon nanotube is provided, a carbon nanotube is grown from the catalytic metal. A carbon supply gas may be $C_{1-3}$ hydrocarbon gas, for example, acetylene, ethylene, ethane, propylene, propane, or methane gas. A carbon nanotube is generally grown at a temperature of approximately 700 to 800° C. The carbon supply gas may be supplied with a transport gas, such as a hydrogen gas, or an argon gas or a dilution gas, such as a hydride gas to adjust the growth rate and time of a carbon nanotube.

It is understood that a method of synthesizing the carbon nanotube is not limited to as the above described method.

A carbon nanotube made according to the above described method includes large amounts of various types of impurities which lowers electron emission characteristics of an electron emission source. Therefore, the synthesis method discussed above may precede an impurity removal process, e.g., a purification method. The purification method may be selected from various methods, such as ultrasonic washing, centrifugation, chemical precipitation, filtering, and chromatography.

An embodiment of the invention provides for an electron emission source including a carbon nanotube in which a FWHM of X-ray diffraction is less than or equal to 0.6 or less.

The electron emission source may be fabricated by direct growth of a carbon nanotube on a substrate using a method such as chemical vapor deposition or by a paste method using a paste composition containing a carbon nanotube. The paste method is advantageous over the chemical vapor deposition method with respect to mass production and fabrication cost.

With respect to fabrication of an electron emission source using a paste method, the electron emission source may include one or more of an adhesive components and a sintered resultant of the adhesive component. The adhesive component enhances adhesion between a carbon nanotube and a substrate. An inorganic adhesive component may include glass frit, silane, and water glass. An organic adhesive component may include cellulosic resins, such as ethyl cellulose and nitro cellulose; acrylic resins, such as polyester acrylate, epoxy acrylate, and urethane acrylate, and vinyl resins. A metal having a low melting point may also be used as the adhesive component.

According to another embodiment of the invention, there is provided an electron emission device including a substrate; a cathode formed on the substrate; and an electron emission source coupled with the cathode and including a carbon nanotube in which a FWHM of X-ray diffraction is less than or equal to 0.6.

FIG. 1 is a partial sectional view illustrating an electron emission device having a triode structure according to an embodiment of the invention.

Referring to FIG. 1, an electron emission device 200 includes an upper plate 201 and a lower plate 202. The upper plate 201 includes an upper substrate 190, an anode 180 formed on a lower surface 190a of the upper substrate 190, and a phosphor layer 170 formed on a lower surface 180a of the anode 180.

The lower plate 202 includes a lower substrate 110 disposed substantially parallel to and separated from the upper substrate 190 by a predetermined distance to define an internal space, a cathode 120 disposed in a substantially stripe pattern on the lower substrate 110, a gate electrode 140 disposed in a substantially stripe pattern that intersects with the cathode 120, an insulating layer 130 provided between the gate electrode 140 and the cathode 120, an electron emission hole 169 defined by the insulating layer 130 and the gate electrode 140, and an electron emission source 160 provided lower than the gate electrode 140 in the electron emission hole 169 and electrically coupled with the cathode 120.

The upper plate 201 and the lower plate 202 are maintained at a lower vacuum pressure than atmospheric pressure. A spacer 192 is provided between the upper plate 201 and the lower plate 202 to support the upper plate 201 and the lower plate 202 and define an emission space 210.

The anode 180 provides a high voltage necessary for electrons emitted from the electron emission source 160 to accelerate and collide with the phosphor layer 170 at high speed. The phosphor layer 170, when excited by the electrons, emits visible light when falling from high energy level to low energy level. With respect to an electron emission device for creating color images, a red phosphor layer, a green phosphor layer, and a blue phosphor layer together constituting a unit pixel are disposed on the lower surface 180a of the anode 180 in each 210 of a plurality of emission spaces 210.

The gate electrode 140 is allows electrons to easily emit from the electron emission source 160. The insulating layer 130 defines the electron emission hole 169 and insulates the electron emission source 160 from the gate electrode 140.

The electron emission source 160 that emits electrons under an electric field is an electron emission source that includes a carbon nanotube in which a FWHM of X-ray diffraction is less than or equal to 0.6.

According to another embodiment of the invention, there is provided a method of manufacturing an electron emission device, including preparing a composition for electron emission source formation having a carbon nanotube in which a FWHM of X-ray diffraction is less than or equal to 0.6 and a vehicle; printing the composition for electron emission source formation; sintering the composition for electron emission source formation; and activating the resultant sintered product.

A method of manufacturing an electron emission device according to an embodiment of the invention is described below.

A composition for electron emission source formation is prepared, which includes a carbon nanotube and a vehicle.

The carbon nanotube is responsible for electron emission. As described above, a carbon nanotube may be used that has a FWHM of X-ray diffraction that is less than or equal to 0.6. The carbon nanotube may be used in an amount of approximately 0.1 to 30 wt %, and preferably approximately 5 to 20 wt %.

The vehicle adjusts the viscosity and printability of the composition for electron emission source formation. The vehicle includes a polymer component or an organic solvent component.

The polymer component in the vehicle may include, but is not limited to, cellulosic resins such as ethyl cellulose and nitro cellulose; acrylic resins such as polyester acrylate, epoxy acrylate, and urethane acrylate; and vinyl resins. The polymer component may be used in an amount of approximately 5 to 60 wt %, based on the total weight of the composition for electron emission source formation.

The organic solvent component in the vehicle may include, but is not limited to, butyl carbitol acetate (BCA), terpineol (TP), toluene, texanol, and butyl carbitol (BC). The organic solvent component may be used in an amount of approximately 40 to 80 wt %, based on the total weight of the composition for electron emission source formation.

The composition for electron emission source formation may include an adhesive component to improve adhesion between the carbon nanotube and a substrate. The adhesive component may be one or more selected from a group consisting of an inorganic adhesive component, an organic adhesive component, and a metal having low melting point.

The composition for electron emission source formation may further include a filler, a photosensitive resin, a viscosity modifier, a resolution enhancer, etc. The filler improves conductivity of the carbon nanotube that may be insufficiently attached to the substrate and may be Ag, Al, Pd, etc. The photosensitive resin is used to print the composition for electron emission source formation according to an area intended for electron emission source formation.

The composition for electron emission source formation may further include a photosensitive monomer; a photoinitiator; a photosensitive resin such as polyester acrylate; a non-photosensitive polymer such as cellulose, acrylate, and a vinyl polymer; a dispersant; a defoamer, etc.

The photosensitive monomer may be used as a pattern dissolution enhancer, and may include a thermally decomposable acrylate monomer, benzophenone monomer, acetophenone monomer, or thioxanthone monomer. The photosensitive monomer may be used in an amount of approximately 3 to 40 wt %.

The photoinitiator may be a conventional photoinitiator art and may be used in an amount of approximately 0.05 to 10 wt %.

The composition for electron emission source formation with the above composition may have a viscosity of approximately 5,000 to 50,000 cps.

The thus-prepared composition for electron emission source formation is then printed on a substrate. The term "substrate" refers to a substrate intended for electron emission source formation and may be a conventional substrate.

The printing method varies according to a presence or an absence of a photosensitive resin in the composition for electron emission source formation. When the composition for electron emission source formation includes a photosensitive resin, a photoresist pattern does not need to be formed. That is, a composition for electron emission source formation having a photosensitive resin is print-coated on a substrate, exposed and developed according to a desired pattern of an electron emission source. When no photosensitive resins are included in the composition for electron emission source formation, a photolithography process using a photoresist film pattern is required. That is, after a photoresist film pattern is formed from a photoresist film, a composition for electron emission source formation is printed using the photoresist film pattern.

The printed composition for electron emission source formation is then sintered to improve adhesion between the carbon nanotube and the substrate. In addition, enhancement in durability may be improved and outgasing may be decreased by melting and solidifying of at least a portion of the adhesive component. The sintering temperature is determined according to the temperature and time for evaporation of the vehicle and sintering of the adhesive component in the composition for electron emission source formation. Generally, the sintering may be performed at a temperature of approximately 350 to 500° C., and preferably approximately 450° C. When the sintering temperature is less than 350° C., evaporation of the vehicle may be insufficient. When the sintering temperature is greater than 500° C., the carbon nanotube may be damaged.

The resultant sintered product is then activated to form an electron emission source. For example, the activation may be performed by coating the resultant sintered product with a polyimide polymer-containing surface treatment agent that can be cured as a film by heating, followed by heating and delamination of a film formed by the heating. Alternatively, the activation may be performed by a rolling process, e.g., forming an adhesive portion on a surface of a roller driven by a driving source and pressing the resultant sintered product with the roller under a predetermined pressure. Through the activation, the carbon nanotube may be exposed on a surface of the electron emission source or the carbon nanotube may be adjusted so that it is vertically aligned.

An embodiment of the invention is described below using examples. However, it is understood that the following Examples are provided only for illustrative purposes.

Preparation of Carbon Nanotubes

Figure 4:
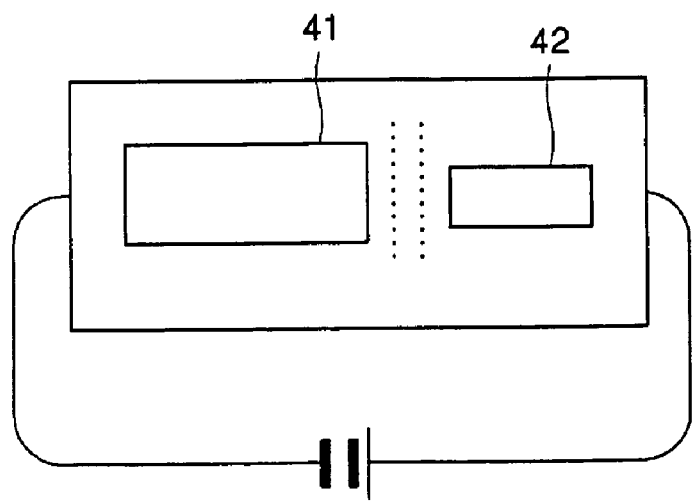
FIG. 4 is a schematic view illustrating the structure of an electric discharge apparatus for producing carbon nanotubes according to an embodiment of the invention by an electric discharge method.

Carbon nanotubes according to an embodiment of the invention were prepared by an electric discharge method. FIG. 4 schematically illustrates the structure of an electric discharge apparatus performing the electric discharge method. According to the electric discharge method, two graphite or metal bars are used as a cathode 41 and an anode 42. A direct current power is applied between the two electrodes to induce discharge between the two electrodes.

A large amount of electrons generated by the discharge travel to and collide with the anode 42. Carbon crusts detach from the anode 42 when the electrons collide with the anode 42 and condense on a surface of the cathode 41 that is maintained at a low temperature, to prepare carbon nanotubes.

Formation of Electron Emission Sources

EXAMPLE 1

Figure 2A:
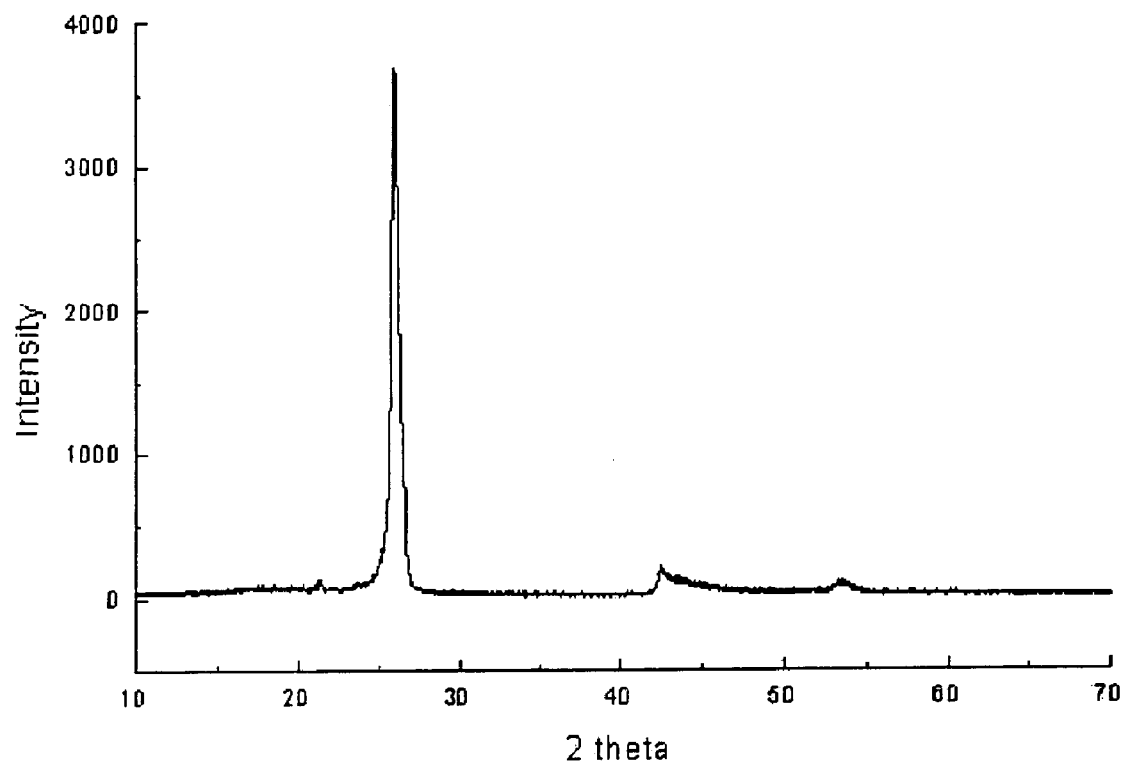
FIGS. 2A, 2B and 2C illustrate X-ray diffraction data for carbon nanotubes according to an embodiment of the invention (FIG. 2A) and conventional carbon nanotubes (FIGS. 2B and 2C).

The carbon nanotubes prepared as described above, in which a FWHM was 0.5481 (see X-ray diffraction data of FIG. 2A), glass frit, ethyl cellulose, methyl acrylic acid, and butyl carbitol acetate were mixed together to prepare a composition for electron emission source formation having a viscosity of 25,000 cps. The composition was coated on a substrate and exposed to light using a pattern mask and parallel exposure equipment having an exposure energy of approximately 2,000 mJ/cm$^2$. The exposed resultant was developed by spraying and sintered at approximately 450° C. to obtain electron emission sources.

COMPARATIVE EXAMPLE 1

Figure 2B:
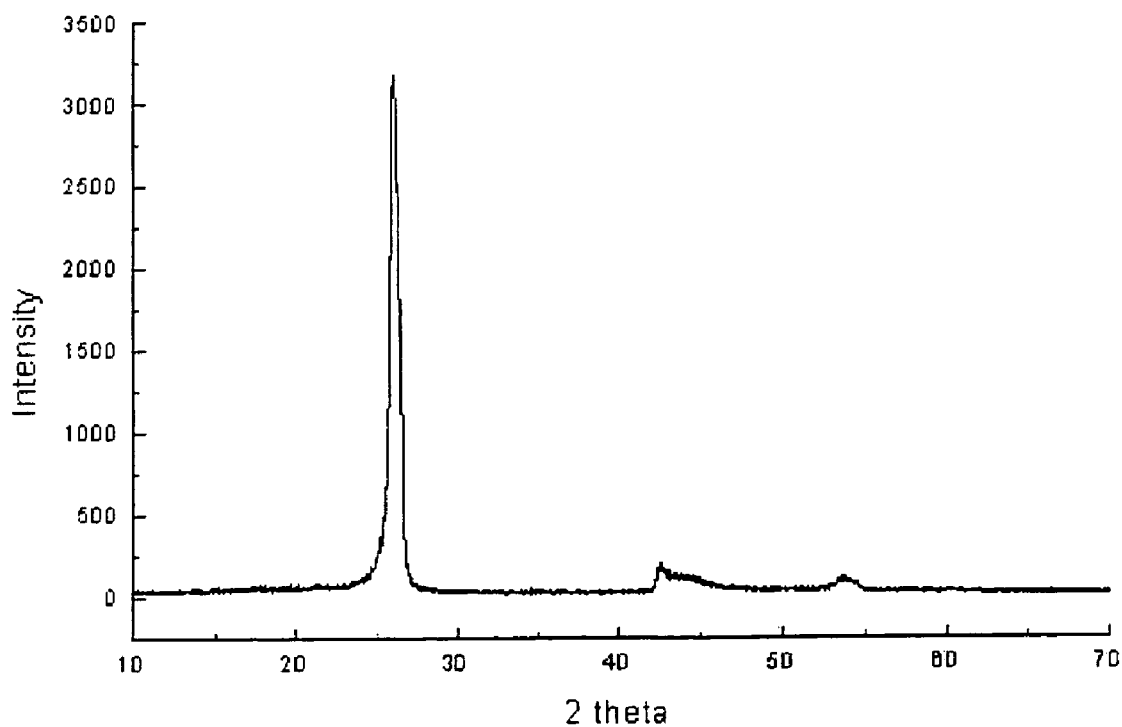

Electron emission sources were formed in the same manner as in Example 1 except that carbon nanotubes having a FWHM of 0.7188 (see X-ray diffraction data of FIG. 2B) were used.

COMPARATIVE EXAMPLE 2

Figure 2C:
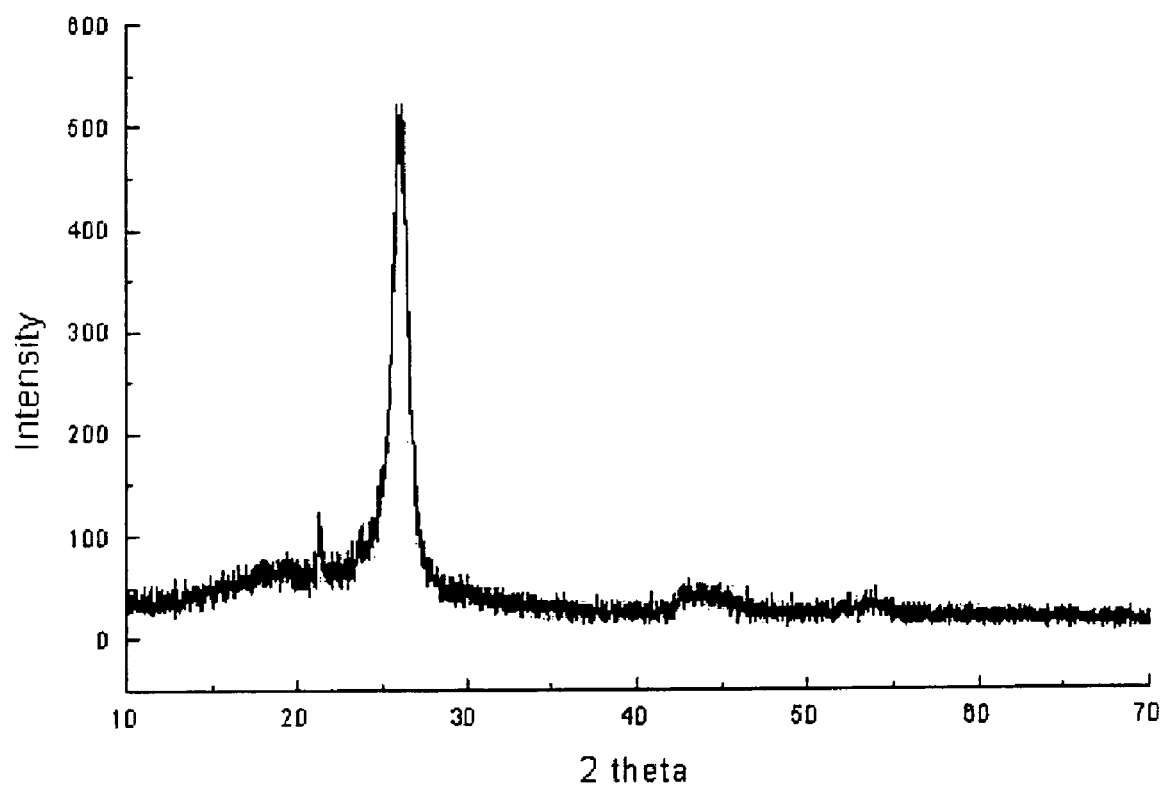

Electron emission sources were formed in the same manner as in Example 1 except that carbon nanotubes having a FWHM of 1.1028 (see X-ray diffraction data of FIG. 2C) were used.

Current Density Measurements

Figure 3:
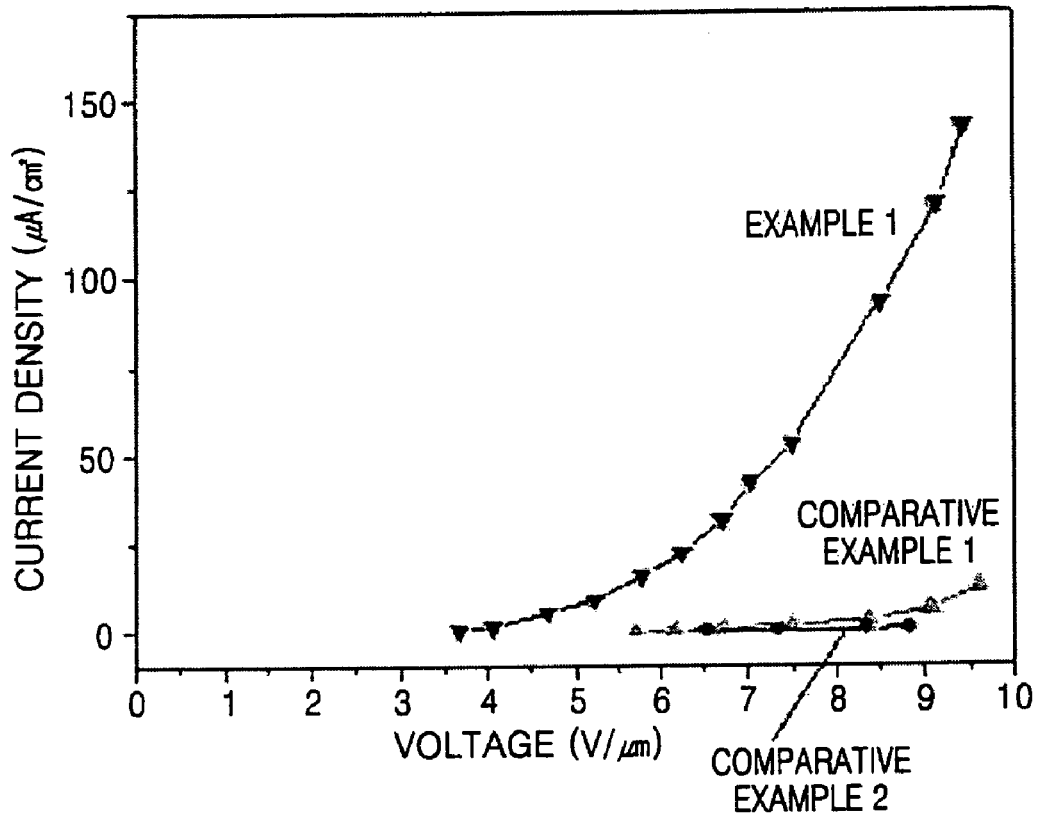
FIG. 3 is a graph illustrating a current density with respect to voltage for electron emission sources including carbon nanotubes according to an embodiment of the invention and electron emission sources including conventional carbon nanotubes.

Current densities for the electron emission sources of Example 1, Comparative Examples 1 and 2 were measured and the results of the measurement are shown in FIG. 3. As shown in FIG. 3, a current density gradient of the electron emission sources according to an embodiment of the invention is steeper than the current density gradients of the electron emission sources according to the Comparative Examples.

Fabrication of Electron Emission Devices

Lower substrates were prepared. Cathodes made of a transparent indium tin oxide (ITO) material were formed in a substantially stripe pattern on the lower substrates. A polymide insulating material was then screen-printed on the cathodes to form insulating layers. A paste containing a conductive material, such as silver (Ag), copper (Cu), and aluminum (Al), was screen-printed on the insulating layers to form gate electrodes. The gate electrodes and the insulating layers were then etched so that surfaces of the cathodes were exposed to define electron emission holes. The gate electrodes were patterned in a substantially stripe shape by a photolithography process to intersect with the cathode electrode patterns.

A paste for electron emission source formation having carbon nanotubes in which a FWHM of X-ray diffraction was less than or equal to 0.6 and vehicles, was then coated in the electron emission holes to form electron emission sources. The resultant structure was sintered and activated to form electron emission devices.

According to the above described embodiment of invention, there is provided a carbon nanotube in which a FWHM of X-ray diffraction is less than or equal to 0.6, and which has properties of high crystallinity and good I-V characteristics. The use of an electron emission source including the above described carbon nanotube enables production of an electron emission device having greater brightness and a longer lifetime than conventional electron emission sources.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A carbon nanotube having a Full-Width at Half-Maximum of X-ray diffraction that is less than or equal to 0.6.

2. The carbon nanotube of claim 1, wherein the carbon nanotube has a 2θ range from approximately 26.5 to 65 in an X-ray diffraction analysis.

3. The carbon nanotube of claim 1, wherein the carbon nanotube is formed according to a method selected from a group consisting of electric discharge, laser deposition, vaporization, thermal chemical vapor deposition, and plasma enhanced chemical vapor deposition.

4. The carbon nanotube of claim 3, wherein the carbon nanotube is made by an arc discharge using a hydrogen gas.

5. An electron emission source comprising the carbon nanotube of claim 1.

6. The electron emission source of claim 5, wherein the electron emission source is formed by directly growing the carbon nanotube on a substrate or by pasting a paste composition comprising the carbon nanotube or the substrate.

7. An electron emission device, comprising:
a substrate;
a cathode provided on the substrate; and
an electron emission source coupled with the cathode formed on the substrate and comprising a carbon nanotube having a Full-Width at Half-Maximum of X-ray diffraction that is less than or equal to 0.6.

* * * * *